United States Patent
Künstle et al.

(10) Patent No.: US 7,810,615 B2
(45) Date of Patent: Oct. 12, 2010

(54) BRAKE DISK

(75) Inventors: Reiner Künstle, Nürtingen (DE); Michael Roupp, Berghülen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 893 days.

(21) Appl. No.: 10/586,579

(22) PCT Filed: Jan. 14, 2005

(86) PCT No.: PCT/EP2005/000326

§ 371 (c)(1),
(2), (4) Date: Jul. 19, 2006

(87) PCT Pub. No.: WO2005/068869

PCT Pub. Date: Jul. 28, 2005

(65) Prior Publication Data

US 2007/0144836 A1    Jun. 28, 2007

(30) Foreign Application Priority Data

Jan. 19, 2004    (DE) ............... 10 2004 002 710

(51) Int. Cl.
*B62L 5/00* (2006.01)
(52) U.S. Cl. ................. 188/26; 188/218 XL; 188/18 A
(58) Field of Classification Search ............ 188/26, 188/218 XL, 24.11, 18 A, 17, 264 A, 264 AA, 188/18, 264 R
See application file for complete search history.

(56) References Cited

U.S. PATENT DOCUMENTS 4,645,041 A    2/1987 Bass .............. 188/218 XL 4,821,848 A * 4/1989 Izumine .............. 188/218 XL (Continued)

FOREIGN PATENT DOCUMENTS

DE    29915404 U1    1/2000

(Continued)

OTHER PUBLICATIONS

Http://www.alphastechnik.de/html/index.php?k=10&sk=3, Beringer brochure, 7 pages.

(Continued)

*Primary Examiner*—Xuan Lan Nguyen
(74) *Attorney, Agent, or Firm*—Alan Kamrath; Kamrath & Associates PA

(57) ABSTRACT

A brake disk for a disk brake, in particular, for motor cycles or bicycles, includes a brake band of a first material which has a high heat resistance and an inner part (20) of a second material which has a lower density than the first material. The brake band and the inner part (20) each have a plurality of extensions, which in each case are arranged in pairs bordering one another. A plurality of connecting elements connect the brake band (10) to the inner part (20) by being received in recesses (13, 23) formed in the extensions. Thus, a divided brake disk has little deformation or wear in the region of the connection between the brake band and the inner part in combination with a low weight. Specifically, the recess (23) is formed in such a way that the connecting line (51) between the ends of the recess (23) is at an angle α of from 15 to 85° to the tangential direction (50).

19 Claims, 5 Drawing Sheets

U.S. PATENT DOCUMENTS

| | | | |
|---|---|---|---|
| 6,467,589 B2 * | 10/2002 | Seymour | 188/218 XL |
| 6,530,457 B1 | 3/2003 | Nago et al. | 188/26 |
| 2005/0082125 A1 * | 4/2005 | Gehrs | 188/218 XL |

FOREIGN PATENT DOCUMENTS

| | | |
|---|---|---|
| EP | 0291697 | 11/1988 |
| EP | 0971147 | 1/2000 |
| EP | 0985843 | 3/2000 |
| EP | 1094229 | 4/2001 |
| EP | 1122162 | 8/2001 |
| JP | 62266233 | 11/1987 |
| WO | WO 03/064882 A1 | 8/2003 |

OTHER PUBLICATIONS

Notification of Transmittal of Copies of Translation of the International Preliminary Report on Patentability, and International Preliminary Report on Patentability mailed Oct. 12, 2006 and English Translation of the Written Opinion of the International Search Authority for International Application No. PCT/EP2005/000326, 7 pages.

* cited by examiner

BRAKE DISK

The present invention relates to a brake disk according to the preamble of claim 1.

A divided brake disk is sold, for example, by Beringer as an AERONAL brake disk. The known brake disk has a steel brake band which is connected to an inner aluminum part via six connecting elements. The brake band has six extensions which border corresponding extensions of the inner part. The extensions bordering one another have in each case semicircular recesses which receive the connecting elements. The opposite edges of the extensions run in the circumferential direction. Those sections of the edges which are in each case before the recess during forward travel in the direction of rotation are arranged a smaller distance away from the center of the brake disk than the corresponding rear sections. The connecting lines of the ends of the respective semicircular recesses for the connecting elements are therefore inclined about 12° relative to the tangential direction. In a brake disk in new condition, the main load occurring during braking and due to the connecting bolts is no longer in a region in which the inner part borders the brake band but somewhat further in the center. Since the extension of the inner part between the edge opposite the extension of the brake band and the inner ring for fixing to a hub is not in the direction of the force occurring during braking, the higher rear section of the extension bends during braking and the main load is displaced further toward the end of the recesses in the extensions of the inner part. As a result, the recesses are subject to greater wear. Furthermore, since the edges opposite the extension of the brake band run in the circumferential direction, the brake band rotates relative to the inner part in the circumferential direction with increasing wear, and the braking force is furthermore transmitted by the connecting element from the brake band to the inner part. The wear thus increases even further.

It is therefore the object of the invention to provide a divided brake disk which has little deformation or wear in the region of the connection between the brake band and the inner part in combination with a low weight.

According to one embodiment of the invention, a brake disk according to the invention, in particular for motor cycles or bicycles, comprises a brake band of a first material which has a high heat resistance, an inner part of a second material which has a lower density than the first material and a plurality of connecting elements. The brake band has a plurality of extensions and the inner part has a plurality of extensions, which in each case are arranged in pairs bordering one another. The a plurality of connecting elements connect the brake band to the inner part by being received in recesses formed in the extensions, with the recess being formed in such a way that the connecting line between the ends of the recess is at an angle of from 15 to 85° to the tangential direction.

In this description, tangential direction is to be understood as meaning the direction of a tangent of a circle concentric with the brake disk at a point which lies in the region of the recess or of the edge section to which reference is made.

During braking, brake linings act on the brake band and retard its rotation. The braking force is transmitted from the brake band via the connecting elements to the inner part, which connecting elements are received in the recesses of the extensions. The embodiment according to the invention has the advantage that, during braking, the connecting elements no longer exert a load on the recesses mainly at the ends thereof but further toward the center of the recesses. Because the load is not applied in the end region, the result is less wear.

The angle is preferably from 20 to 60° and particularly preferably from 25 to 40°. Embodiments having an angle of about 30° are most preferred. It has been found that, at this angle, the loads are best absorbed and the wear is lowest.

That end of the recess which is at the front in the direction of rotation during forward travel is a smaller distance away from the center of the brake disk than that end of the recess which is at the back in the direction of rotation during forward travel.

Alternatively or additionally, those sections of the edges of the extensions which are before the recesses in the direction of rotation during forward travel may be at an angle relative to the respective tangential direction. Those respective ends of the regions which are at the front in the direction of rotation during forward travel are a smaller distance away from the center of the brake disk than those corresponding ends of the regions which are at the back in the direction of rotation during forward travel. This has the advantage that the edges of the extensions of the brake band can be supported on the opposite edges of the extensions of the inner part if the recesses in the extensions of the inner part and/or the connecting elements are worn to such an extent that the edges touch one another as a result of a slight rotation between brake band and inner part in the circumferential direction. Consequently, further pronounced wear is prevented because the braking force can also be transmitted by the abutting edges.

Alternatively or additionally, those sections of the edges of the extensions which are behind the recesses in the direction of rotation during forward travel may be at an angle relative to the respective tangential direction. Those respective ends of the regions which are at the front in the direction of rotation during forward travel are a smaller distance away from the center of the brake disk than those corresponding ends of the regions which are at the back in the direction of rotation during forward travel. This results in the advantages mentioned above in relation to the oblique position of sections in front of the recess. Advantageously, both the sections in front of the recesses and those behind the recesses of both the brake band and the inner part are formed in this manner.

The various angles may be of the same size or of different sizes. The edges opposite one another may be linear or at least partly or completely curvilinear.

Alternatively or additionally, the recess or the recesses in the extensions of the inner part can enclose the connecting elements received in them in an angular range of more than 180°. This results in better support in the generally softer inner part and, hence, less wear, and in the further advantages mentioned. Preferably, the recess or the recesses in the extensions of the inner part encloses or enclose the connecting elements received in them in an angular range of more than 181°, 185°, 190° or 195°. Good results with respect to little wear can be achieved with an angular range of approximately 200°.

The angular range may be from 185 to 300°, preferably from 190 to 270° and, in particular, approximately 200°.

The connecting elements may be bolts and/or rivets.

The brake band may be formed from steel. The brake band may be corrugated or annular. Furthermore, the brake band may have holes which are preferably in the form of slots or circular. For weight reasons, the inner part is preferably formed from light metal or a light metal alloy, in particular from aluminum, an aluminum alloy, titanium, a titanium alloy, a magnesium alloy or another suitable light metal alloy. The inner part may have an inner ring for fixing to a hub.

The extensions can preferably each have a strut which is at the front in the direction of rotation during forward travel and may each have a strut which is at the back in the direction of rotation during forward travel.

According to a preferred embodiment, the rear strut is oriented in such a way that the rear strut is substantially in the direction of the braking force occurring during braking in the case of forward travel. This has the advantage that the strut can be made lighter because the loads are lower transversely to the longitudinal direction. This feature may also be advantageous alone without the abovementioned features for divided brake disks and can justify an invention.

The invention is described in more detail with reference to the working examples shown in the figures.

Figure 1:
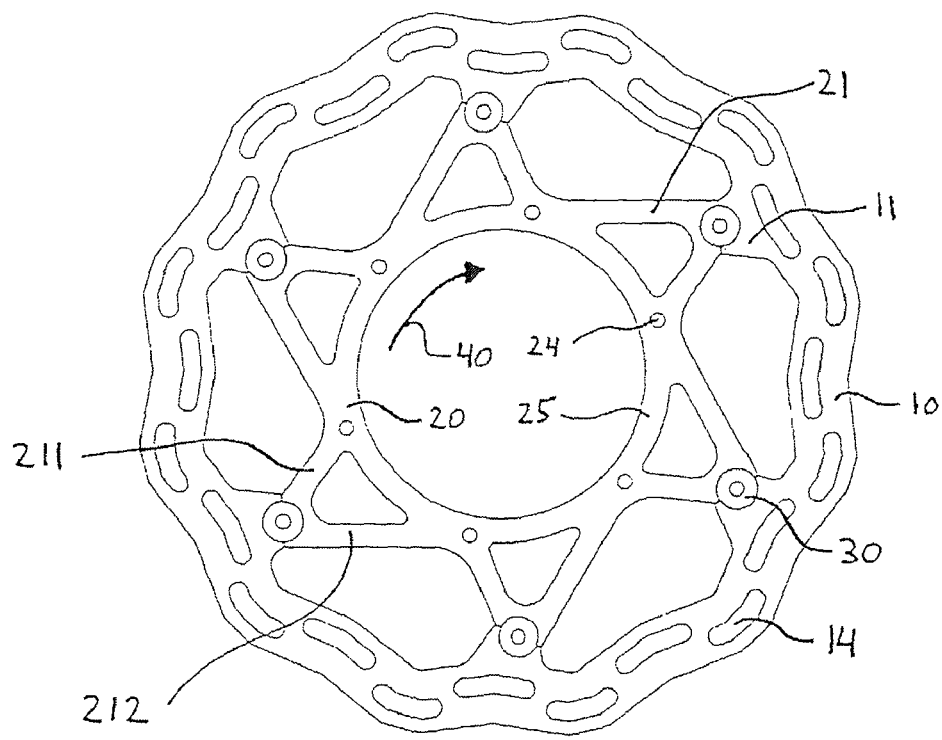
FIG. 1 shows a side view of a first embodiment of a brake disk according to the invention.

FIG. 1 shows a side view of a brake disk according to the invention. The brake disk has a brake band 10 and an inner part 20. Six extensions 11 which are opposite six extensions 21 of the inner part 20 are formed on the brake band 10. The brake band 10 is connected to the inner part 20 by six connecting elements 30 in the regions of the extensions.

The extensions 21 have a strut 211 which is at the front in the direction of rotation 40 for forward travel and a strut 212 which is at the back in the direction of rotation 40 in the case of forward travel. The rear strut 212 is located substantially exactly in the direction of the braking force which is absorbed by the strut and is transmitted from the brake band via the connecting elements 30 to the inner part 20, said direction occurring during braking.

The brake band has an inner ring 25 having six holes 24 for fixing to a hub which is not shown.

The brake band 10 is corrugated and has slots 14 for saving weight and for cooling.

Figure 2:
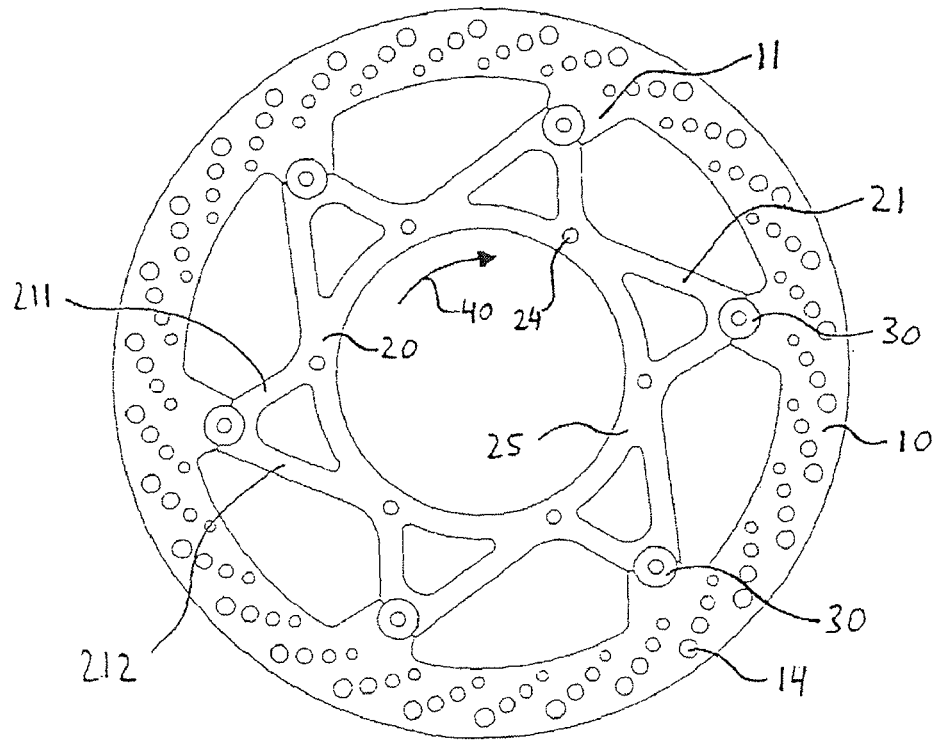
FIG. 2 shows a side view of a second embodiment of a brake disk according to the invention.

FIG. 2 shows an alternative embodiment of a brake disk according to the invention from the side. This embodiment differs from the embodiment shown in FIG. 1 only in the design of the brake band. The same reference numerals are used. Because of the corresponding components and features, reference will be made to the description of FIG. 1. Below, the differences will be discussed.

The brake band has an annular shape. Holes 14 are provided in the brake band.

It is clear that, alternatively to the embodiments shown in FIGS. 1 and 2, brake bands without holes can also be provided.

Figure 3:
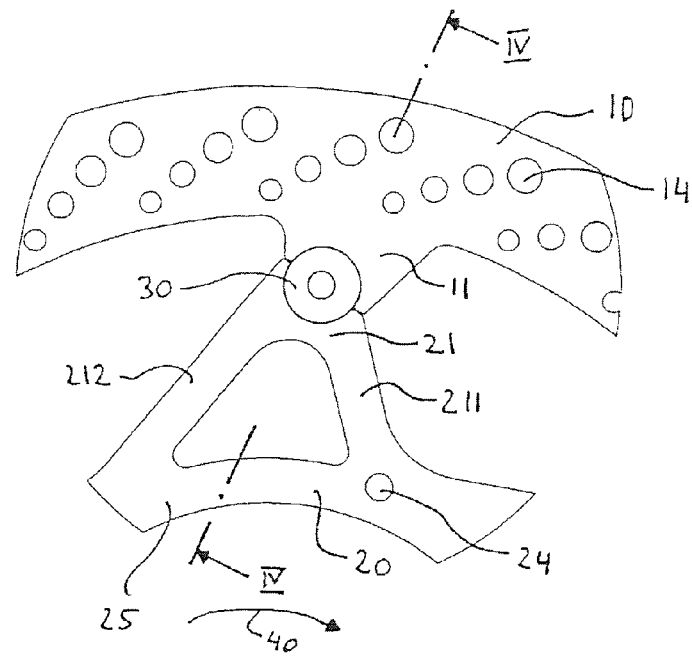
FIG. 3 shows an enlarged partial view of the side view of the brake disk of FIG. 2.

FIG. 3 shows an enlarged partial view of the side view of the brake disk according to the invention of FIG. 2. The brake band 10 has six extensions 11 which border corresponding extensions 21 of the inner part 20. The extensions 11 and 21 are connected to one another by a connecting element 30, which is shown in section in FIG. 4. For weight reasons, the extension 21 is formed with a recess which is enclosed by the struts 211, 212 and the inner ring 25.

Figure 4:
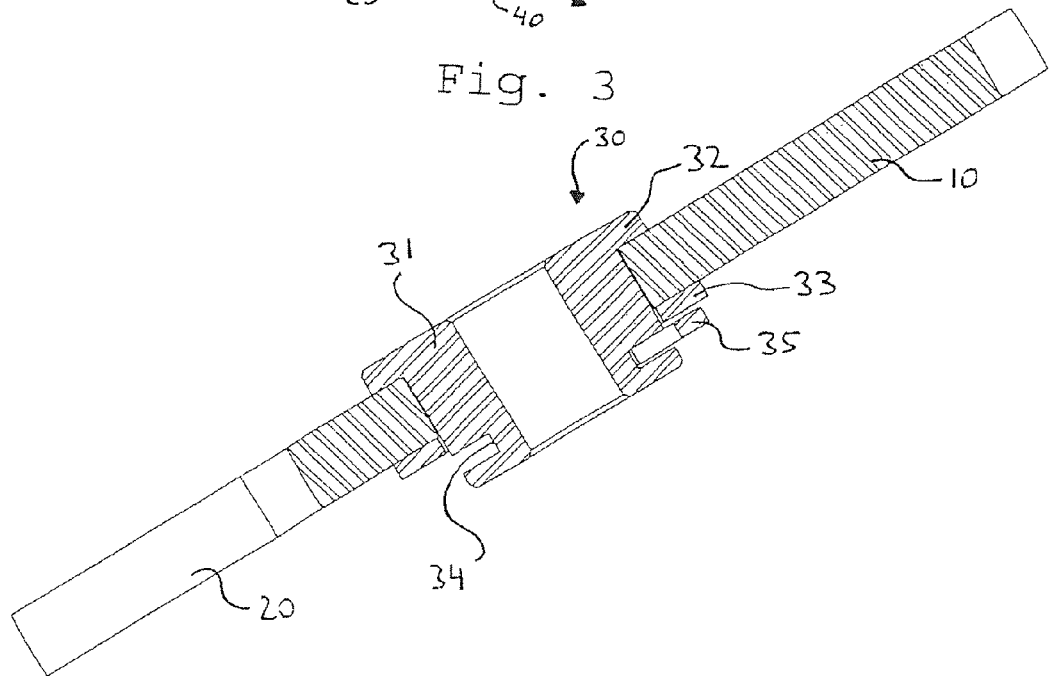
FIG. 4 shows a section through a segment of the brake disk, through the region of the connection between brake band and inner part, along the line IV-IV of FIG. 3.

FIG. 4 shows a sectional view through the brake disk of FIG. 2 along the line IV-IV in FIG. 3. The connecting element 30 comprises a bolt 31 which has a flange 32 on one side and a groove 34 on the other side. The flange 32 secures the connection between the brake band 10 and the inner part 20 by preventing lateral displacement. A ring 33 which is secured by a circlip 35 which is arranged in the groove 34 is provided on the other side of the connecting element 30.

In an alternative embodiment of the divided brake disk according to the invention, the connecting elements are rivets which have, on both sides, flanges or heads which limit a movement between brake band and inner part in the axial direction. As in the embodiment shown in FIGS. 2 to 4 or in FIG. 1, the force during braking is transmitted from the brake band to the inner part via the connecting elements. Otherwise, reference is made to the description of the other working examples.

Figure 5:
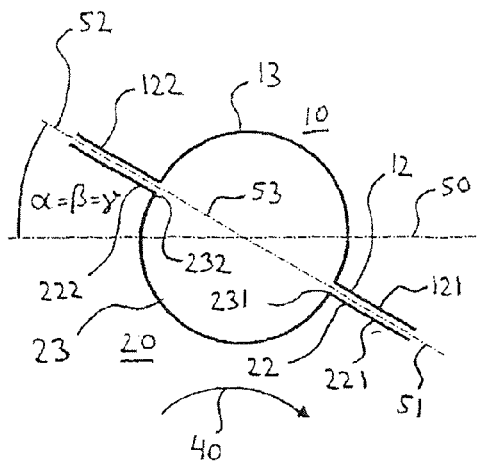
FIG. 5 shows a schematic diagram of the opposite edges and of the recesses of the extensions of the brake band and the inner part according to the embodiments of FIG. 1 and FIG. 2.

FIG. 5 shows a schematic diagram of the formation of the edges 12, 22 and recesses 13, 23 in the transition region between the brake band 10 and the inner part 20 of the embodiment of the invention which is shown in FIG. 2. In the diagram, only the edge 12 of the brake band 10 and the edge 22 opposite it are shown for the example of one of the six extensions 11, 21 opposite one another. For the sake of clarity, the connecting element 30 is omitted. The edge 12 of the extension 11 of the brake band 10 has a section 121 which is at the front in the direction of rotation 40 during forward travel and adjacent to which is a recess 13 for receiving the connecting element and a section 122 which is at the back in the direction of rotation 40 during forward travel. The edge 22 of the extension 21 of the inner part 20 accordingly has a section 221 which is at the front in the direction of rotation 40 during forward travel and a section 222 which is at the back in the direction of rotation 40 during forward travel. The recesses 13 and 23 together form an approximately circular passage for receiving the connecting element (bolt or rivet), which is not shown.

FIGS. 6 to 10 show, by way of example, alternative developments of the edges and recesses 12, 13 and 22 and 23.

For the sake of clarity, FIGS. 6 to 10 omit the reference numerals for the edges and recesses, which, apart from the orientation and size, correspond to the edges and recesses shown in FIG. 5.

Guide lines which comprise the tangential direction 50, the connecting line 51 between the ends of the recess 13 or the recess 23, the direction 52 of the section 121 or 221 which is at the front in the direction of travel during forward travel, and the direction 53 of the section 122 or 222 which is at the back in the direction of travel 40 during forward travel.

In FIGS. 5 to 10, the angle $\alpha$ between the tangential direction 50 and the connecting line 51, the angle $\beta$ between the tangential direction 50 and the direction 52 and the angle $\gamma$ between the tangential direction and the direction 53 are furthermore shown.

In FIG. 5, the connecting line 51 corresponds to the directions 52 and 53. The angles $\alpha$, $\beta$ and $\gamma$ are of the same magnitude.

Figure 6:
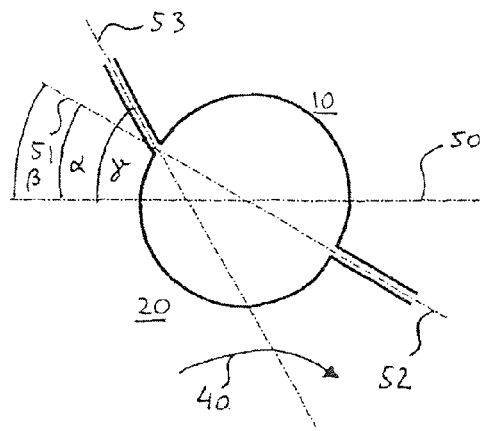
FIGS. 6-10 show a schematic diagram of alternative developments of the edges and recesses, corresponding to FIG. 5.

In the embodiment of FIG. 6, the connecting line 51 corresponds to the direction 52 and the angle $\alpha$ corresponds to the angle $\beta$. The angle $\gamma$ between the tangential direction 50 and the direction 53 is greater than the angles $\alpha$ and $\beta$.

Figure 7:
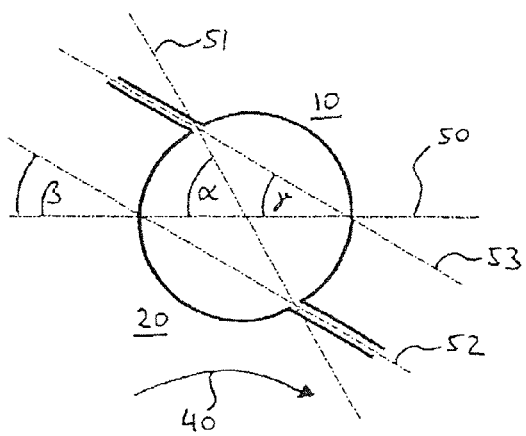

In the embodiment of FIG. 7, the angle $\alpha$ between the connecting line 51 and the tangential direction 50 is greater than the approximately equal angles $\beta$ and $\gamma$ between the direction 52 and the tangential direction 50 and between the direction 53 and the tangential direction 50, respectively.

Figure 8:
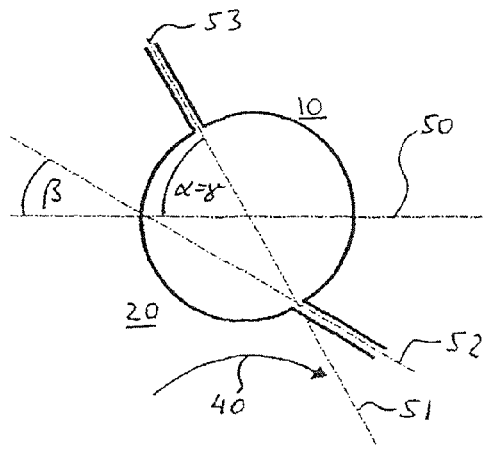

In FIG. 8, the angles α and γ correspond to one another and are greater than the angle β.

Figure 9:
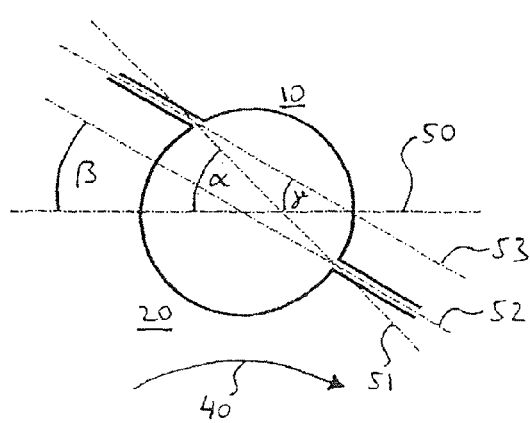

In FIG. 9, the range of wrap of the recess 23 is greater than the range of wrap of the recess 13. The angle α between the connecting line 51 and the tangential direction 50 is greater than the angles β and γ, which are of approximately equal magnitude.

Figure 10:
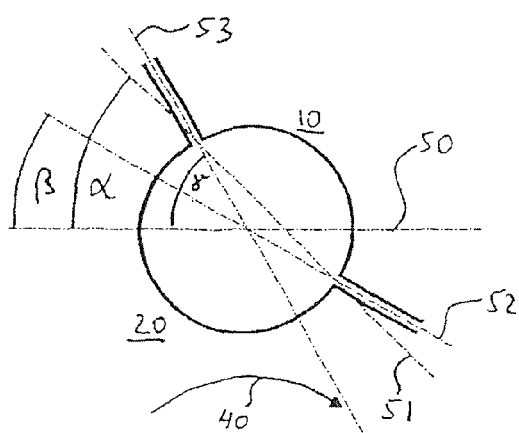

In the embodiment of FIG. 10, the range of wrap of the recess 23 is likewise greater than the range of wrap of the recess 13. The angle γ between the direction 53 and the tangential direction 50 is greater than the angle α between the connecting line 51 and the tangential direction 50, which in turn is greater than the angle β between the direction 52 and the tangential direction 50.

FIGS. 11 to 14 show the currently preferred embodiment of the invention. The brake disk shown corresponds to the embodiment of FIG. 2, except for the formation of the extensions 11 of the brake band 10 and of the extensions 21 of the inner part 20. Below, only the differences relative to the embodiment of FIG. 2 will be described and otherwise reference will be made to the above description of the embodiment of FIG. 2.

Figure 11:
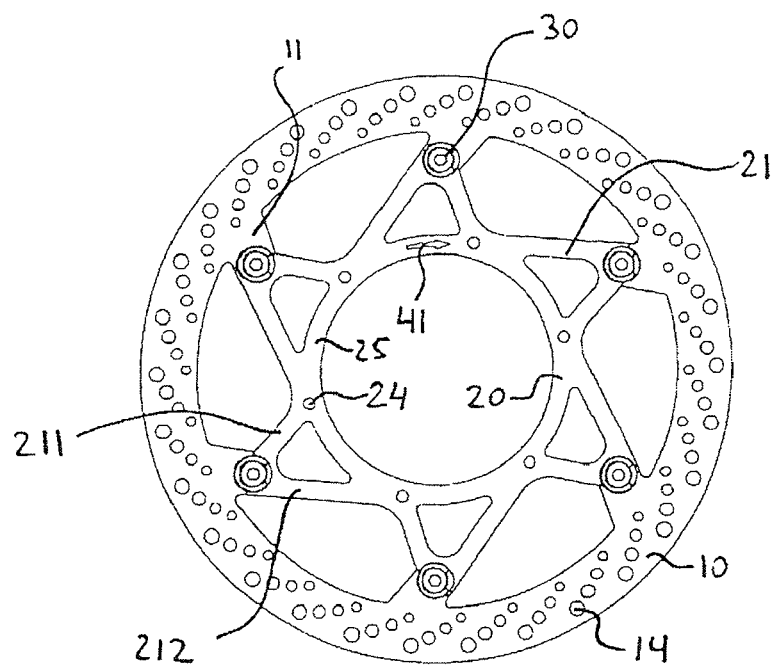
FIG. 11 shows a side view of one of the preferred embodiments of a brake disk according to the invention.
Figure 12:
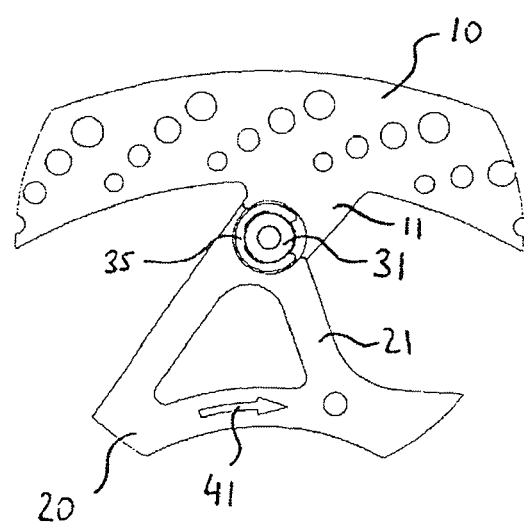
FIG. 12 shows an enlarged partial view of the side view of the brake disk of FIG. 11.

FIG. 11 shows a side view of the brake disk with the connecting elements 30. The direction of rotation for forward travel is designated by the arrow 41 on the inner part 20 of the brake disk. FIG. 12 shows an enlarged partial view which shows a cut-out of the brake disk in the region of a pair of extensions 11 and 21 bordering one another.

Figure 13:
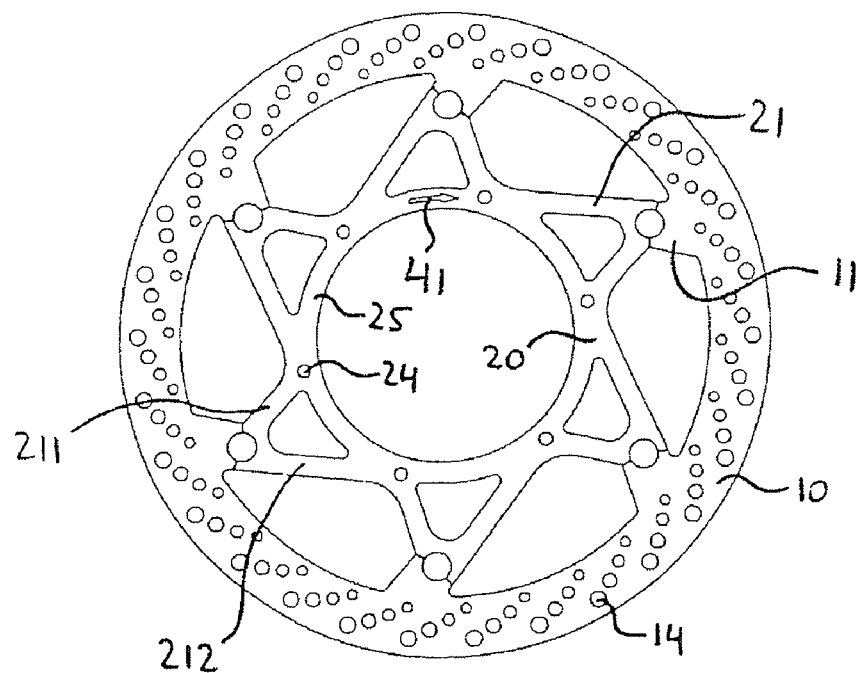
FIGS. 13 and 14 show views corresponding to FIGS. 11 and 12, without showing the connecting elements.
Figure 14:
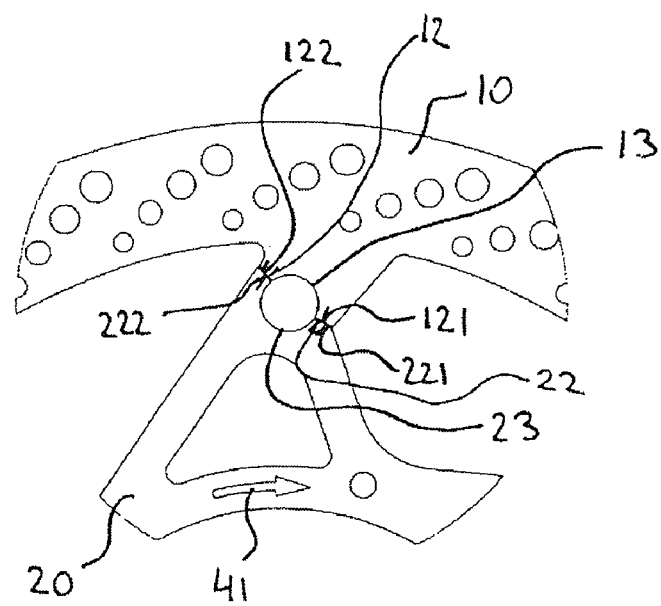

FIGS. 13 and 14 show views corresponding to FIGS. 11 and 12, the connecting elements having been omitted for better presentation of the edges of the extensions. The edge 12 of the extension 11 of the brake band 10 has a section 121 which is at the front in the direction of rotation (arrow 41) during forward travel and adjacent to which is a recess 13 for receiving the connecting element, and a section 122 which is at the back in the direction of rotation (arrow 41) during forward travel. The edge 22 of the extension 21 of the inner part 20 accordingly has a section 221 which is at the front in the direction of rotation (arrow 41) during forward travel, a recess 23 and a section 222 which is at the back in the direction of rotation (arrow 41) during forward travel. The recesses 13 and 23 together form an approximately circular passage for receiving the connecting element 30 shown in FIGS. 11 and 12. The angular range with which the recess 23 of the inner part 20 encloses the connecting element 30 is approximately 200°.

Relative to the tangential direction, the front sections 222 of the edges 22 are steeper than the rear sections 221 of the edges 22. Relative to the tangential direction, the connecting line between the ends of the recess 23 is less steep than the front sections 222 of the edges 22 and steeper than the rear sections 221 of the edges 22. The embodiment corresponds substantially to the alternative shown in FIG. 10, the angular range of the recesses 23 being somewhat smaller in the embodiment of FIGS. 11 to 14 than in the embodiment of FIG. 10, and the front sections 222 in the embodiment of FIGS. 11 to 14 being somewhat less steep than in the embodiment of FIG. 10, relative to the tangential direction.

Further alternatives are conceivable. In particular, the angles α, β, γ shown may vary and the sections 121, 122, 221, 222 may be not only straight but also at least partially or completely curvilinear, for example curved.

The invention claimed is:

1. A brake disk for a disk brake comprising a brake band of a first material which has a high heat resistance and an inner part of a second material which has a lower density than the first material, the brake band having a plurality of extensions and the inner part having a plurality of extensions, with the plurality of extensions of the brake band and of the inner part arranged in pairs bordering one another, and a plurality of connecting elements connecting the brake band to the inner part, with the connecting elements received in recesses formed in the plurality of extensions to transfer force transmitted from the brake bank via the connecting elements to the inner part, wherein each recess is formed in such a way that the connecting line between ends of the recess is at an angle α of from 15 to 85° to a tangential direction, wherein the recess encloses the connecting element in an angular range of more than 180°.

2. The brake disk as claimed in claim 1, wherein the angle α is approximately 30°.

3. The brake disk as claimed in claim 1, wherein the end of the recess which is at front in a direction of rotation during forward travel is a smaller distance away from the center of the brake disk than the end of the recess which is at back in direction of rotation during forward travel.

4. The brake disk as claimed in claim 1, wherein a region of an edge of the extension which is before the recess in the direction of rotation during forward travel is at an angle β relative to the tangential direction, an end of the region section which is at the front in the direction of rotation during forward travel being a smaller distance away from a center of the brake disk than the end of the region which is at the back in the direction of rotation during forward travel.

5. The brake disk as claimed in claim 4, wherein a section of the edge of the extension which is behind the recess in the direction of rotation during forward travel is at an angle γ to the tangential direction, an end of the section which is at the front in the direction of rotation during forward travel being a smaller distance away from the center of the brake disk than that end of the section which is at the back in the direction of rotation during forward travel.

6. The brake disk as claimed in claim 1, wherein a section of the edge of the extension which is behind the recess in the direction of rotation during forward travel is at an angle γ to the tangential direction, an end of the section which is at the front in the direction of rotation during forward travel being a smaller distance away from the center of the brake disk than that end of the section which is at the back in the direction of rotation during forward travel.

7. The brake disk as claimed in claim 6, wherein the angle γ substantially corresponds to the angle α.

8. The brake disk as claimed in claim 1, wherein the angular range is approximately 200°.

9. The brake disk as claimed in claim 1, wherein the connecting elements are bolts and/or rivets.

10. The brake disk as claimed in claim 1, wherein the brake band is formed from steel.

11. The brake disk as claimed in claim 1, wherein the brake band is corrugated.

12. The brake disk as claimed in claim 1, wherein the brake band has holes in the form of slots.

13. The brake disk as claimed in claim 1, wherein the inner part is formed from light metal or a light metal alloy.

14. The brake disk as claimed in claim 1, wherein the inner part has an inner ring for fixing on a hub.

15. The brake disk as claimed in claim 1, wherein the extensions of the inner part each have a strut which is at front in a direction of rotation during forward travel and a strut which is at back in the direction of rotation during forward travel.

16. The brake disk as claimed in claim 1, wherein the extensions of the inner part each have a strut which is at back in a direction of rotation during forward travel with a rear strut of the struts of the extensions oriented to substantially lie in a braking force direction occurring during braking during forward travel.

17. A brake disk for a disk brake comprising a brake band of a first material which has a high heat resistance and an inner part of a second material which has a lower density than the first material, the brake band having a plurality of extensions and the inner part having a plurality of extensions, with the plurality of extensions of the brake band and of the inner part arranged in pairs bordering one another, and a plurality of connecting elements connecting the brake band to the inner part, with the connecting elements received in recesses formed in the plurality of extensions to transfer force transmitted from the brake bank via the connecting elements to the inner part, wherein each recess is formed in such a way that the connecting line between ends of the recess is at an angle $\alpha$ of from 15 to 85° to a tangential direction, wherein a region of an edge of the extension which is before the recess in the direction of rotation during forward travel is at an angle $\beta$ relative to the tangential direction, an end of the region section which is at the front in the direction of rotation during forward travel being a smaller distance away from a center of the brake disk than the end of the region which is at the back in the direction of rotation during forward travel, wherein a section of the edge of the extension which is behind the recess in the direction of rotation during forward travel is at an angle $\gamma$ to the tangential direction, an end of the section which is at the front in the direction of rotation during forward travel being a smaller distance away from the center of the brake disk than that end of the section which is at the back in the direction of rotation during forward travel, wherein the angle $\gamma$ is greater than the angle $\alpha$.

18. The brake disk as claimed in claim 17, wherein the angle $\gamma$ is greater than the angle $\beta$.

19. The brake disk as claimed in claim 17, wherein substantially the angle $\gamma$ corresponds to the angle $\beta$.

* * * * *

UNITED STATES PATENT AND TRADEMARK OFFICE
CERTIFICATE OF CORRECTION

| | | |
|---|---|---|
| PATENT NO. | : 7,810,615 B2 | Page 1 of 1 |
| APPLICATION NO. | : 10/586579 | |
| DATED | : October 12, 2010 | |
| INVENTOR(S) | : Reiner Künstle et al. | |

It is certified that error appears in the above-identified patent and that said Letters Patent is hereby corrected as shown below:

Title page, item (75), cancel "Michael Roupp" and substitute therefore --Michael Ruopp--.

Column 1, lines 3-4, cancel "according to the preamble of claim 1".

Column 1, line 49, cancel "a".

Signed and Sealed this
Twenty-sixth Day of April, 2011

David J. Kappos
*Director of the United States Patent and Trademark Office*